(12) United States Patent
Gray et al.

(10) Patent No.: US 9,266,270 B2
(45) Date of Patent: Feb. 23, 2016

(54) MOLD-TOOL SYSTEM INCLUDING NOZZLE-TIP ASSEMBLY CONFIGURED FOR REDUCED AXIAL TILTING

(75) Inventors: Stephen Linwood Gray, Cambridge, VT (US); Douglas Oliver Hall, Jeffersonville, VT (US); Abdeslam Bouti, Swanton, VT (US)

(73) Assignee: Husky Injection Molding Systems, Ltd, Bolton, Ontario (CA)

( * ) Notice: Subject to any disclaimer, the term of this patent is extended or adjusted under 35 U.S.C. 154(b) by 101 days.

(21) Appl. No.: 14/111,770

(22) PCT Filed: Apr. 24, 2012

(86) PCT No.: PCT/US2012/034732
§ 371 (c)(1),
(2), (4) Date: Oct. 15, 2013

(87) PCT Pub. No.: WO2012/148870
PCT Pub. Date: Nov. 1, 2012

(65) Prior Publication Data
US 2014/0037783 A1  Feb. 6, 2014

Related U.S. Application Data

(60) Provisional application No. 61/479,094, filed on Apr. 26, 2011.

(51) Int. Cl.
*B29C 45/20* (2006.01)
*B29C 45/27* (2006.01)

(52) U.S. Cl.
CPC ............. *B29C 45/20* (2013.01); *B29C 45/27* (2013.01); *B29C 45/278* (2013.01); *B29C 2045/2759* (2013.01); *B29C 2045/2761* (2013.01); *B29C 2045/2791* (2013.01)

(58) Field of Classification Search
CPC ....... B29C 45/20; B29C 45/27; B29C 45/278; B29C 2045/2759; B29C 2045/2791; B29C 2045/2761
See application file for complete search history.

(56) References Cited

U.S. PATENT DOCUMENTS

| | | | |
|---|---|---|---|
| 3,677,682 A * | 7/1972 | Putkowski | ................ 425/192 R |
| 4,344,750 A | 8/1982 | Gellert | |
| 4,663,811 A | 5/1987 | Gellert | |
| 4,777,348 A | 10/1988 | Gellert | |
| 4,923,387 A | 5/1990 | Gellert | |
| 4,964,795 A | 10/1990 | Tooman | |
| 5,208,052 A | 5/1993 | Schmidt et al. | |
| 5,318,434 A * | 6/1994 | Gellert | ......................... 425/549 |
| 5,474,440 A | 12/1995 | Gellert | |
| 5,554,395 A * | 9/1996 | Hume et al. | .................. 425/549 |

(Continued)

FOREIGN PATENT DOCUMENTS

| | | |
|---|---|---|
| JP | S5531604 U | 8/1978 |
| JP | H1170547 A | 3/1999 |
| TW | 200835587 A | 9/2008 |

OTHER PUBLICATIONS

Search Report, 4 pages.

*Primary Examiner* — Yogendra Gupta
*Assistant Examiner* — Emmanuel S Luk

(57) ABSTRACT

A mold-tool system (100), comprising: a nozzle tip assembly (200) having a tip-body assembly (206), the tip-body assembly (206) being configured for reduced axial tilting, at least in part.

11 Claims, 2 Drawing Sheets

(56) References Cited

U.S. PATENT DOCUMENTS

Figure 1:
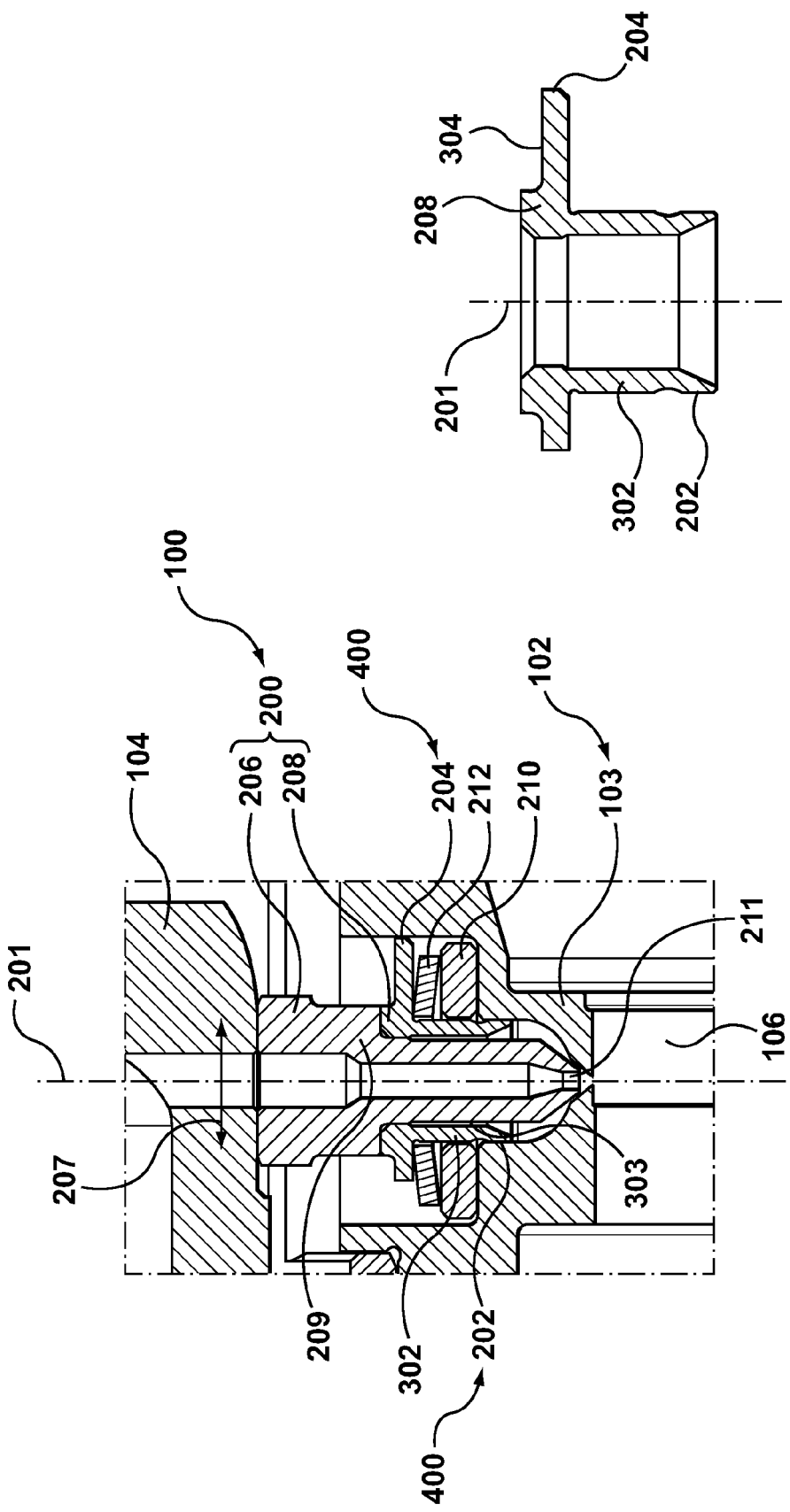
Figure 2:
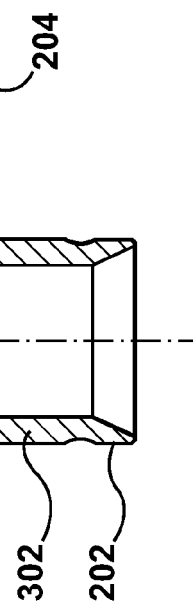

| | | | |
|---|---|---|---|
| 5,795,599 A * | 8/1998 | Gellert | 425/549 |
| 6,062,846 A | 5/2000 | Kalemba | |
| 6,227,461 B1 * | 5/2001 | Schroeder et al. | 239/135 |
| 6,302,680 B1 * | 10/2001 | Gellert et al. | 425/549 |
| 6,394,785 B1 * | 5/2002 | Ciccone | 425/549 |
| 6,609,902 B1 * | 8/2003 | Blais et al. | 425/549 |
| 6,789,745 B1 * | 9/2004 | Babin et al. | 239/135 |
| 7,481,649 B2 | 1/2009 | Gaillard et al. | |
| 7,510,392 B2 | 3/2009 | Olaru | |
| 2001/0033044 A1 * | 10/2001 | Fikani | 264/328.15 |
| 2003/0082263 A1 * | 5/2003 | Olaru | 425/549 |
| 2003/0082264 A1 * | 5/2003 | Babin et al. | 425/549 |
| 2003/0082266 A1 * | 5/2003 | Babin et al. | 425/562 |
| 2003/0118688 A1 * | 6/2003 | Bazzo et al. | 425/568 |
| 2003/0235638 A1 * | 12/2003 | Gellert | 425/568 |
| 2004/0224046 A1 * | 11/2004 | Babin | 425/192 R |
| 2004/0258788 A1 * | 12/2004 | Olaru | 425/191 |
| 2007/0003661 A1 * | 1/2007 | Ciccone | 425/564 |
| 2010/0092602 A1 | 4/2010 | Gunther et al. | |
| 2010/0227019 A1 * | 9/2010 | Kaushal et al. | 425/569 |
| 2013/0287889 A1 * | 10/2013 | Hammond | 425/568 |

* cited by examiner

MOLD-TOOL SYSTEM INCLUDING NOZZLE-TIP ASSEMBLY CONFIGURED FOR REDUCED AXIAL TILTING

TECHNICAL FIELD

An aspect generally relates to (but is not limited to) a mold-tool system, and/or a molding system having the mold-tool system.

BACKGROUND

U.S. Pat. No. 5,208,052 (SCHMIDT et al.) discloses a hot runner nozzle assembly including a mold assembly with a mold cavity therein, an inlet port in the mold assembly communicating with the mold cavity, an injection nozzle for delivering molten resin to the inlet port and an insulating sleeve positioned around the nozzle between the mold assembly and nozzle insulating the nozzle from the mold assembly.

U.S. Pat. No. 7,481,649 (GAILLARD) discloses an injection molding apparatus that includes a hot runner and a mold. The hot runner includes at least one nozzle that engages a nozzle-receiving cavity of the mold. The molding apparatus further includes a nozzle sleeve surrounding a portion of the nozzle and having a nozzle-sealing opening that receives the nozzle. The nozzle sleeve is movably secured to the hot runner or the mold so that when the mold is removed from the hot runner, the nozzle sleeve remains secured to the corresponding part of the apparatus. When the mold and hot runner are engaged with one another, the nozzle sleeve is springingly urged into sealing engagement with a sealing surface of the nozzle receiving cavity of the mold.

SUMMARY

The inventors have researched a problem associated with known molding systems that inadvertently manufacture bad-quality molded articles or parts. After much study, the inventors believe they have arrived at an understanding of the problem and its solution, which are stated below, and the inventors believe this understanding is not known to the public. Sliding seals are occasionally used between components in a hot runner system to maintain pressure. This seal type may be incorporated when one component expands or moves relative to another component (most often due to different rates or directions of thermal expansion). Contact pressure for sealing between the components may generally be achieved by spring loading one component against the other, or by thermal expansion. During the act of sliding, and due to friction between components, one component may tip or tilt, causing the contact pressure to vary along the contact face. This contact pressure may reduce over part of the contact area to the point that the seal no longer functions properly. Nozzle tips that incorporate sliding seals can have the tendency to weep or leak plastic during sliding. As a secondary problem or effect, tilting of the nozzle tip can also result in misalignment between the nozzle tip and an injection orifice, which can cause component damage and/or badly molded parts.

According to one aspect, there is provided a mold-tool system (100) comprising: a nozzle-tip assembly (200) having a tip-body assembly (206), the tip-body assembly (206) being configured for reduced axial tilting, at least in part.

According to another aspect, there is provided a mold-tool system (100) comprising: a nozzle-tip assembly (200) having: a tip-body assembly (206); and means (400) for reduced axial tilting, at least in part of the tip-body assembly (206).

The term "axial" generally indicates a direction along an axis. The technical effect of the mold-tool system described above may be to reduce, at least in part, tilting of the nozzle tip. When the nozzle tip tilts, leakage may occur.

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which:

FIGS. 1, 2, 3, 4 depict schematic representations of a mold-tool system (100).

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

FIGS. 1, 2, 3, 4 depict the schematic representations of the mold-tool system (100). Specifically, FIG. 1 depicts a cross sectional view of the mold-tool system (100).

It will be appreciated that the features depicted in FIGS. 1-4 may be combined in any suitable permutation and combination. The mold-tool system (100) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" 3$^{rd}$ Edition authored by JOHANNABER (ISBN 3-446-17733-7) and/or (iv) "*Runner and Gating Design Handbook*" authored by BEAUMONT (ISBN 1-446-22672-9). It will be appreciated that for the purposes of this document, the phrase "includes (but is not limited is to)" is equivalent to the word "comprising." The word "comprising" is a transitional phrase or word that links the preamble of a patent claim to the specific elements set forth in the claim that define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated (that is, subjected to a process) as an open transition, which is the broadest form of transition, as it does not limit the preamble to whatever elements are identified in the claim.

The definition of the mold-tool system (100) is as follows: a system that may be positioned and/or may be used in an envelope defined by a platen system of the molding system, such as an injection-molding system for example. The platen system may include a stationary platen and a movable platen that is moveable relative to the stationary platen. The molding system may have the mold-tool system (100).

In accordance with FIGS. 1, 2, 3, 4, the mold-tool system (100) generally includes (and is not limited to) a nozzle-tip assembly (200) configured for reduced, at least in part, axial tilting. The term "axial" generally indicates a direction along an axis (201) (for example). FIGS. 1, 2, 3, 4 depict several non-limiting examples of the features of the mold-tool system (100) in various combinations and permutations. It will be appreciated that the features and/or the examples depicted in FIGS. 1, 2, 3, 4 may be combined in any suitable permutation and combination. It will be appreciated that the term "assembly" may be defined as "a collection of parts so assembled as to form a complete machine, structure, or unit of a machine. An assembly may be a collection of parts to be fitted together to make a whole".

According to a general example, the mold-tool system (100) includes (and is not limited to): a nozzle-tip assembly (200) having (and not limited to): a tip-body assembly (206), and means (400) for reduced axial tilting, at least in part of the tip-body assembly (206). The technical effect that may be achieved is that a range (207) of limited axial movement of the nozzle-tip assembly (200) may result or may be achieved with the nozzle-tip assembly (200).

By way of a more detailed example, the means (400) includes (and is not limited to): a first radial support (202) configured to supportably contact, at least in part, a mold assembly (102), and a second radial support (204) configured to supportably contact, at least in part, the mold assembly (102). The second radial support (204) is set apart from the first radial support (202). The first radial support (202) and the second radial support (204) are configured to reduce, at least in part, axial tilting of the nozzle-tip assembly (200).

In accordance with yet another example, it will be appreciated that the nozzle-tip assembly (200) includes (and is not limited to): (i) the first radial support (202), and (ii) the second radial support (204). The first radial support (202) is configured to supportably contact, at least in part, a mold assembly (102). The second radial support (204) is configured to supportably contact, at least in part, the mold assembly (102). The second radial support (204) is set apart from the first radial support (202). The first radial support (202) and the second radial support (204) are configured to reduce, at least in part, axial tilting of the nozzle-tip assembly (200). In accordance with a specific option, the mold assembly (102) includes a cavity insert (103). The mold cavity (106) is defined by the mold assembly (102).

In accordance with an option, the second radial support (204) is axially set apart from the first radial support (202) along an axis (201) of the nozzle-tip assembly (200). The nozzle-tip assembly (200) is configured for attachment, at least in part, to a nozzle assembly (104). In addition, the second radial support (204) is axially set apart from the first radial support (202) along an axis (201) of the nozzle-tip assembly (200). The second radial support (204) and the first radial support (202) are located on opposite sides of the nozzle-tip assembly (200).

By way of a more specific example, the nozzle-tip assembly (200) includes (and is not limited to): (i) a tip-body assembly (206), and (ii) a seal assembly (208) that surrounds the tip-body assembly (206). The seal assembly (208) may be called a "seal ring". The seal assembly (208) is a device that prevents and/or reduces leakage—that is, leakage of a resin from the mold assembly (102) toward the nozzle assembly (104). The seal assembly (208), generally speaking, includes (and is not limited to) the first radial support (202), and the second radial support (204). According to a specific option, the seal assembly (208) includes (and is not limited to): (i) a shaft body (302) that has the first radial support (202), and (ii) an arm assembly (304) that extends radially outwardly from the shaft body (302). It will be appreciate that the arm assembly (304) may include one or more arms. The arm assembly (304) has the second radial support (204). The shaft body (302) defines a shaft that is configured to receive, at least in part, the nozzle-tip assembly (200). It will be appreciated that generally, a "body" (a main part or central part) may include one or more elements. According to the example depicted in FIG. 1, the second radial support (204) extends axially further away than the extent of the first radial support (202). It will be appreciated that this arrangement may be varied in an opposite sense; alternatively, the second radial support (204) and the first radial support (202) may be equal in their axial extension away from the tip-body assembly (206).

By way of yet another specific example, the nozzle-tip assembly (200) further includes (and is not limited to) a thermal-insulator assembly (210) that surrounds a seal assembly (208). The thermal-insulator assembly (210) contacts the mold assembly (102). The thermal-insulator assembly (210) is configured to thermally insulate, at least in part, the nozzle-tip assembly (200) from the mold assembly (102).

By way of yet another specific example, the nozzle-tip assembly (200) further includes (and is not limited to) a spring assembly (212) that is located between, at least in part, the thermal-insulator assembly (210) and the seal assembly (208). The spring assembly (212) is configured to bias, at least in part, a tip-body assembly (206) against the nozzle assembly (104). The spring assembly (212) may or may not include an elongated flexion spring, for example.

Figure 4:
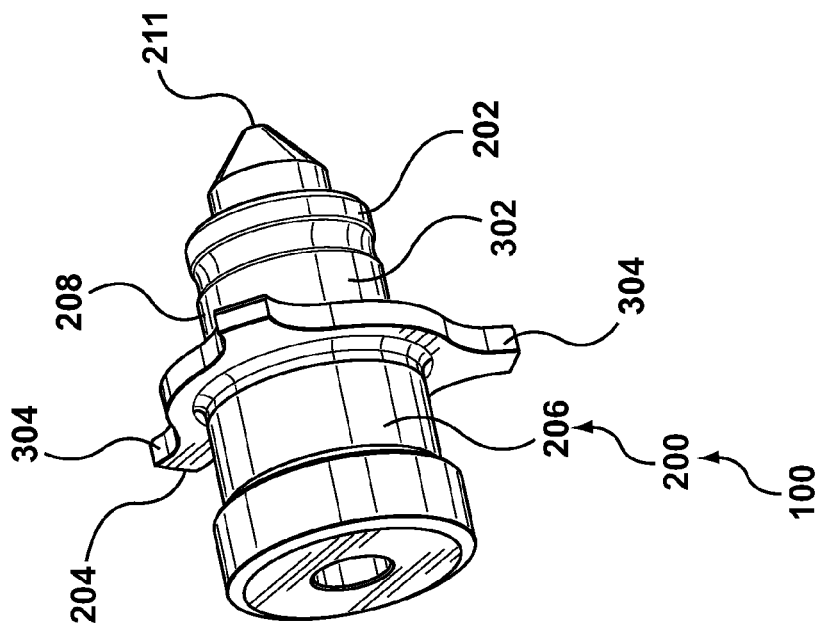
Figure 3:
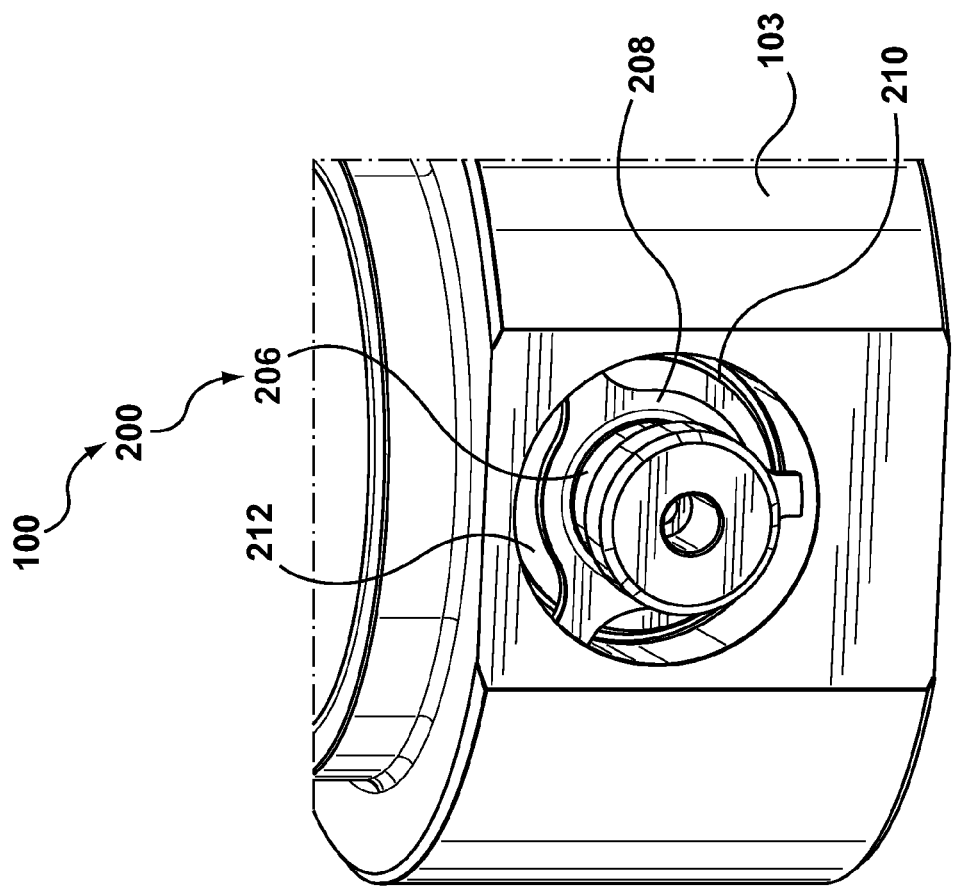

Referring now to FIG. 4, another example of the mold-tool system (100) is depicted, in which the seal assembly (208) has a shaft body (302) that is elongated and thinned out, so that an inner surface of the shaft body (302) avoids touching, at least in part, the outer surface of the tip-body assembly (206), so that there is an air located, at least in part, between the outer surface of the tip-body assembly (206) and the inner surface of the shaft body (302) of the seal assembly (208). The air gap (303) is depicted in FIG. 1 between the inner surface of the shaft body (302) and the outer surface of the tip-body assembly (206). The shaft body (302) reduces heat transfer along the shaft body (302) toward an exit portal (211) of the tip-body assembly (206). The shaft body (302) is thinned out so that heat transfer along the shaft body (302) may be reduced toward an exit portal (211) of the tip-body assembly (206). The seal assembly (208) makes physical contact with the tip-body assembly (206) at a contact region (209). The contact region (209) is located proximately midway between the opposite ends of the tip-body assembly (206).

The mold-tool system (100) reduces tilting of the nozzle-tip assembly (200). By reducing tilting of the nozzle-tip assembly (200), leakage of resin from the nozzle-tip assembly (200) may be reduced and/or may be eliminated (if possible). The second radial support (204) prevents tilting of the nozzle-tip assembly (200). The second radial support (204) has reduced clearance to the cavity insert (103). As the back portion of the nozzle-tip assembly (200) may be loaded in a radial direction, the second radial support (204) may contact the cavity insert (103), and by way of this arrangement, tilting of the nozzle-tip assembly (200) may be reduced and/or prevented. This arrangement (that is, something made by arranging parts or other things together) may maintain even contact pressure on a sealing face, and may prevent leakage of resin between the nozzle-tip assembly (200) and the nozzle assembly (104). In accordance with an option, the second radial support (204) is an extension of the seal assembly (208). The second radial support (204) may have at least one finger or more fingers or may have multiple fingers or arms. In accordance with a specific option, the second radial support (204) may be made from a material with a lower thermal conductivity than the tip-body assembly (206) of the nozzle-tip assembly (200) to minimize heat loss. In accordance with another example, the second radial support (204) may be an additional piece or component that may be added to a back portion of the tip-body assembly (206). In accordance with another example, the second radial support (204) may be an extension of the tip-body assembly (206). The second radial support (204) may also be used on other components of the hot runner system that may utilize sliding seals, such as housings.

ADDITIONAL DESCRIPTION

The following clauses are offered as further description of the examples of the mold-tool system (100): Clause (1): a mold-tool system (100), comprising: a nozzle-tip assembly (200) that may be configured for reduction, at least in part, of axial tilting. Clause (2): the mold-tool system (100) of any clause mentioned in this paragraph, wherein: the nozzle-tip assembly (200) includes: a first radial support (202) that may be configured to supportably contact, at least in part, a mold assembly (102); and a second radial support (204) that may be configured to supportably contact, at least in part, the mold assembly (102), the second radial support (204) that may be set apart from the first radial support (202), and the first radial support (202) and the second radial support (204) that may be configured to reduce, at least in part, axial tilting of the nozzle-tip assembly (200). Clause (3): the mold-tool system (100) of any clause mentioned in this paragraph, wherein: the second radial support (204) is axially set apart from the first radial support (202) along an axis (201) of the nozzle-tip assembly (200). Clause (4): the mold-tool system (100) of any clause mentioned in this paragraph, wherein: the nozzle-tip assembly (200) is configured for attachment to a nozzle assembly (104), the nozzle-tip assembly (200) includes: a tip-body assembly (206); and a seal assembly (208) surrounding the tip-body assembly (206), the seal assembly (208) including: the first radial support (202); and the second radial support (204). Clause (5): the mold-tool system (100) of any clause mentioned in this paragraph, wherein: the nozzle-tip assembly (200) is configured for attachment to a nozzle assembly (104), the nozzle-tip assembly (200) includes: a tip-body assembly (206); and a seal assembly (208) surrounding the tip-body assembly (206), the seal assembly (208) including: a shaft body (302) having the first radial support (202); and an arm assembly (304) extending from the shaft body (302), the arm assembly (304) having the second radial support (204). Clause (6): the mold-tool system (100) of any clause mentioned in this paragraph, wherein: the nozzle-tip assembly (200) further includes: a thermal-insulator assembly (210) surrounding a seal assembly (208), the thermal-insulator assembly (210) contacting the mold assembly (102), the thermal-insulator assembly (210) configured to thermally insulate, at least in part, the nozzle-tip assembly (200) from the mold assembly (102). Clause (7): the mold-tool system (100) of any clause mentioned in this paragraph, wherein: the nozzle-tip assembly (200) further includes: a thermal-insulator assembly (210) surrounding a seal assembly (208), the thermal-insulator assembly (210) contacting the mold assembly (102), the thermal-insulator assembly (210) configured to thermally insulate, at least in part, the nozzle-tip assembly (200) from the mold assembly (102); and a spring assembly (212) that may be located between, at least in part, the thermal-insulator assembly (210) and the seal assembly (208), the spring assembly (212) configured to bias a tip-body assembly (206) against a nozzle assembly (104). Clause (8): the mold-tool system (100) of any clause mentioned in this paragraph, wherein: an inner surface of the shaft body (302) avoids touching, at least in part, the outer surface of the tip-body assembly (206), so that there is an air located, at least in part, between the outer surface of the tip-body assembly (206) and the inner surface of the shaft body (302) of the seal assembly (208), the shaft body (302) reduces heat transfer along the shaft body (302) toward an exit portal (211) of the tip-body assembly (206), and the seal assembly (208) makes physical contact with the tip-body assembly (206) at a contact region (209), and the contact region (209) is located proximately midway between the opposite ends of the tip-body assembly (206). Clause (9): the mold-tool system (100) of any clause mentioned in this paragraph, wherein: the second radial support (204) is made from a material with a lower thermal conductivity than the tip-body assembly (206) of the nozzle-tip assembly (200) to minimize heat loss. Clause (10): the mold-tool system (100) of any clause mentioned in this paragraph, wherein: the second radial support (204) is an additional piece added to a back portion of the tip-body assembly (206). Clause (11): the mold-tool system (100) of any clause mentioned in this paragraph, wherein: the second radial support (204) is an extension of the tip-body assembly (206). Clause (12): the mold-tool system (100) of any clause mentioned in this paragraph, wherein: the second radial support (204) is used on other components of a hot runner system that utilizes sliding seals. Clause (13): a molding system having the mold-tool system (100) of any clause mentioned in this paragraph. FIGS. 1-4 depict examples of features of the mold-tool system (100). Clause (14): the mold-tool system (100) of any clause mentioned in this paragraph, wherein: the second radial support (204) is axially set apart from the first radial support (202) along an axis (201) of the nozzle-tip assembly (200); and the second radial support (204) and the first radial support (202) are located on opposite sides of the nozzle-tip assembly (200). Clause (15): a mold-tool system (100), comprising a nozzle-tip assembly (200) having a tip-body assembly (206); and means (400) for reduced axial tilting, at least in part of the tip-body assembly (206). Clause (16): the mold-tool system (100) of clause (15), wherein: said means (400) includes: a first radial support (202) being configured to supportably contact, at least in part, a mold assembly (102); and a second radial support (204) being configured to supportably contact, at least in part, the mold assembly (102), the second radial support (204) being set apart from the first radial support (202), and the first radial support (202) and the second radial support (204) being configured to reduce, at least in part, axial tilting of the nozzle-tip assembly (200). It will be appreciated that the features and/or the examples depicted in FIGS. 1-4 may be combined in any suitable permutation and combination.

LISTING OF REFERENCE NUMERALS mold-tool system (100)
mold assembly (102)
cavity insert (103)
nozzle assembly (104)
mold cavity (106)
nozzle-tip assembly (200)
axis (201)
first radial support (202)
second radial support (204)
tip-body assembly (206)
range (207)
seal assembly (208)
contact region (209)
thermal-insulator assembly (210)
exit portal (211)

spring assembly (212)
shaft body (302)
air gap (303)
arm assembly (304)

It will be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, components, or software code that is superior to any of the equivalents available to the art. There is no particular mode of practicing the inventions and/or examples of the invention that is superior to others, so long as the functions may be performed. It is believed that all the crucial aspects of the invention have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. A mold-tool system (100), comprising:
   a nozzle assembly defining a melt channel;
   a nozzle-tip assembly (200) defining a melt passage, the nozzle-tip assembly slidingly sealed against the nozzle assembly, the nozzle-tip assembly, the melt channel of the nozzle assembly being in fluid communication with the melt passage of the nozzle tip assembly, having:
      a tip-body assembly (206); and,
      a seal assembly at least partly surrounding the tip-body assembly comprising:
         a first radial support being configured to supportably contact, at least in part, the mold assembly; and
         a second radial support comprising an arm extending radially outward from the nozzle-tip assembly, the second radial support being configured to supportably contact, at least in part, the mold assembly, the second radial support being axially set apart from the first radial support along an axis of the nozzle tip assembly, and the first radial support and the second radial support being configured to reduce, at least in part, axial tilting of the nozzle-tip assembly relative to the nozzle assembly.

2. The mold-tool system (100) of claim 1, wherein:
   the second radial support (204) is axially set apart from the first radial support (202) along an axis (201) of the nozzle-tip assembly (200); and
   the second radial support (204) and the first radial support (202) are located on opposite sides of the nozzle-tip assembly (200).

3. The mold-tool system (100) of claim 1, wherein:
   the seal assembly (208) including:
      a shaft body (302) having the first radial support (202); and
      an arm assembly (304) extending radially outwardly from the shaft body (302), the arm assembly (304) having the second radial support (204).

4. The mold-tool system (100) of claim 1, wherein:
   the nozzle-tip assembly (200) further includes:
      a thermal-insulator assembly (210) surrounding a seal assembly (208), the thermal-insulator assembly (210) contacting the mold assembly (102), the thermal-insulator assembly (210) configured to thermally insulate, at least in part, the nozzle-tip assembly (200) from the mold assembly (102).

5. The mold-tool system (100) of claim 1, wherein:
   the nozzle-tip assembly (200) further includes:
      a thermal-insulator assembly (210) surrounding a seal assembly (208), the thermal-insulator assembly (210) contacting the mold assembly (102), the thermal-insulator assembly (210) configured to thermally insulate, at least in part, the nozzle-tip assembly (200) from the mold assembly (102); and
      a spring assembly (212) being located between, at least in part, the thermal-insulator assembly (210) and the seal assembly (208), the spring assembly (212) configured to bias, at least in part, the tip-body assembly (206) against a nozzle assembly (104).

6. The mold-tool system (100) of claim 1, wherein:
   an inner surface of the shaft body (302) avoids touching, at least in part, the outer surface of the tip-body assembly (206), so that there is an air located, at least in part, between the outer surface of the tip-body assembly (206) and the inner surface of the shaft body (302) of the seal assembly (208),
   the shaft body (302) reduces heat transfer along the shaft body (302) toward an exit portal (211) of the tip-body assembly (206), and
   the seal assembly (208) makes physical contact with the tip-body assembly (206) at a contact region (209), and the contact region (209) is located proximately midway between the opposite ends of the tip-body assembly (206).

7. The mold-tool system (100) of claim 1, wherein:
   the second radial support (204) is made from a material with a lower thermal conductivity than the tip-body assembly (206) of the nozzle-tip assembly (200) to minimize heat loss.

8. The mold-tool system (100) of claim 1, wherein:
   the second radial support (204) is an additional piece added to a back portion of the tip-body assembly (206).

9. The mold-tool system (100) of claim 1, wherein:
   the second radial support (204) is an extension of the tip-body assembly (206).

10. The mold-tool system (100) of claim 1, wherein:
    the second radial support (204) is used on other components of a hot runner system that utilizes sliding seals.

11. A molding system having the mold-tool system (100) of claim 1.

* * * * *